STORAGE BATTERY ELECTROLYTE

Leroy E. Solomon, Huntingdon Valley, Pa., assignor to The Electric Storage Battery Company, a corporation of New Jersey
No Drawing. Filed Apr. 15, 1959, Ser. No. 806,450
9 Claims. (Cl. 136—153)

The present invention generally relates to storage batteries. More specifically, the present invention is concerned with lead-acid and other types of batteries in which sulphuric acid is utilized as the electrolyte.

A general object of the present invention is to provide a substantially solid material which when dissolved in water will provide a sulphuric acid electrolyte of the desired concentration.

In the manufacture of storage batteries, it is generally conventional practice to utilize one of two methods for transporting and storing batteries prior to delivery to the ultimate consumer. The first method, and the one which is generally used, is that of shipping the battery in a wet and charged condition. In this state, the battery plates are fully charged, i.e., the positive plate consists of lead oxide, the negative plate consists of metallic lead and the cell is flooded with electrolyte, generally a mixture of sulphuric acid and water of about 1.250 specific gravity. The second method used for shipping and maintaining batteries is the so-called dry charged method in which the plates of the battery are fully charged as described above and completely dried so that there is no moisture within the cell. The cell itself is then maintained in a sealed condition to prevent the ingress of moisture which would tend to convert the negative active material to lead oxide and thereby decrease the electrical capacity of the battery.

Both of the above described methods have serious limitations. The foremost disadvantage of the first method is the danger of acid spillage or leakage during battery shipment. In addition, it is obvious that the shipment of the battery including the electrolyte increases the weight of the battery and hence the shipping cost. Still further, a conventional lead-acid battery will lose approximately 0.020 specific gravity points per month when standing in the wet and charged condition and, therefore, it must be periodically recharged while in the hands of the dealer. The second method, the so-called dry charged method, has the disadvantage from the manufacturing standpoint in that it is difficult to dry the negative plates sufficiently for the plates to maintain their capacity. In addition, to activate the battery, the dealer, often the proprietor of small service stations and the like, must handle the acid electrolyte with its attendant dangers.

It is, therefore, another object of the present invention to provide a means for producing, shipping and storing batteries that eliminates, to a great extent, all of the aforementioned disadvantages of both the wet charged and dry charged battery systems.

In accordance with the present invention, there is provided a crystalline semi-solid sulphuric acid gel of such concentration that, when dissolved in water, will produce an electrolyte of suitable concentration for battery use. The gel, which is produced by mixing concentrated sulphuric acid and aluminum sulphate, is adapted to be placed in a battery at the time of manufacture and remain substantially inert with respect to all components of the battery until the addition thereto of water. Because of its hygroscopic nature, the presence of the gel within a dry charged battery tends to prevent the discharge of the negative plates by the absorption of moisture which enters the battery. Upon the addition of a specified amount of water to the battery, the gel, which is readily soluble in water, dissolves to provide an electrolyte of suitable concentration and amount to activate the battery. By utilizing the gel of the present invention, batteries may be shipped at a lower cost and without the danger of electrolyte spillage. In addition, batteries may be activated by the mere addition of water, thereby eliminating the necessity of the storing and handling of acid by battery distributors. As will be obvious to those skilled in the art, the present invention also facilitates the storage and shipment of electrolyte apart from the battery in which it is to be used.

Other objects and advantages of the present invention will be readily apparent from the following detailed description of preferred embodiments thereof.

In carrying out one form of the present invention, aluminum sulphate ($Al_2(SO_4)_3 \cdot 18H_2O$) is mixed with a quantity of vitriol, which is sulphuric acid of approximately 1.840 specific gravity at 20° C. The mixing procedure results in the displacement of the 18 mols of water in the aluminum sulphate by 18 mols of the sulphuric acid, producing a compound $$Al_2(SO_4)_3 \cdot 18(H_2SO_4 \cdot H_2O)$$

This compound is a white, crystalline, semi-solid gel that is moderately hygroscopic in the presence of moisture and is readily soluble in water. Gels can be made from sulphuric acid having 1.840 specific gravity in a range of mixtures consisting of about 2.6 to about 10.3 parts by weight of acid to one part by weight of aluminum sulphate ($Al_2(SO_4)_3 \cdot 18H_2O$). It has been found that if either more or less parts by weight are added to one part by weight of sulphuric acid, the gel produced tends to lose its firmness. Where it is desired to provide a less firm gel, the proportions given above can be varied by either adding more or less acid to the mixture.

As will be understood by those skilled in the art, various types of storage batteries are designed to take various amounts and strengths of electrolyte for optimum performance. Specific examples of various gravities of electrolyte which can be formed utilizing vitriol and aluminum sulphate are illustrated in the table below. The specific amounts listed are such as to produce 100 cc. of electrolyte.

| Electrolyte | Gel | | Fill |
|---|---|---|---|
| Specific Gravity | Grams of $Al_2(SO_4)_3 \cdot 18H_2O$ | Grams of 1.840 Sp. Gr. $H_2SO_4$ | Grams of Water |
| 1.250 | 10 | 35 | 80 |
| 1.275 | 11 | 38.5 | 78 |
| 1.300 | 12.2 | 42.7 | 75.1 |

While the present invention has been illustrated with the use of sulphuric acid of 1.840 specific gravity, it should be understood that acid in ranges of gravities of from about 1.300 to 1.840 can be gelled by mixing approximately 3 parts by weight of the acid to one part by weight of the sulphate. It should be understood, however, that where gels are formed of more dilute acid, proportionately more gel will be required to produce an electrolyte of a given concentration. By way of example of the production of an electrolyte gel utilizing acid having a lower concentration, 100 cc. of 1.250 specific gravity electrolyte were produced by adding 64.6 grams of water to a gel formed by mixing 15.1 grams of aluminum sulphate and 45.3 grams of sulphuric acid having a specific gravity of 1.700.

It should also be understood that gels can be made utilizing less hydrated forms of aluminum sulphate, such as $Al_2(SO_4)_3 \cdot 9H_2O$. It should be noted, however, that when a less hydrated aluminum sulphate is utilized, more of it will be required to produce a gel having a given acid content and hence, the electrolyte produced therefrom will contain more aluminum sulphate. While the presence of aluminum sulphate in the electrolyte of a lead-acid battery has not been found to be detrimental, it is felt that as a general rule, it is best to maintain battery electrolytes as pure as possible.

In use, the gel compound can be placed in the sediment space at the bottom of each battery cell compartment and, when it is desired to place the battery in use, water may be added to the cell, thereby, dissolving the gel and producing a liquid electrolyte of the desired specific gravity. It has been found, however, that since the gel is of a high specific gravity, it will tend to stratify when dissolved. Accordingly, in applications where it is desirable to place the gel at the bottom of a cell container, some mechanical or gaseous agitation means should be provided to equalize the strength of the solution throughout the cell.

A preferable construction is to provide means for retaining the gel in the upper portion of the cell above the plates and beneath the point at which the water is added. By this construction, the gel will immediately begin to dissolve upon the addition of water and since the solution having the higher specific gravity is formed near the top of the cell, stratification will be overcome. Such means can consist of any desired perforated bag or mesh type retaining means made of a substance, such as a thermoplastic resin which is inert to the gel.

Comparative tests of a dry charged battery containing a gel in accordance with the present invention and activated by the addition of water, and a dry charge battery activated by the addition of conventional sulphuric acid electrolyte has been made. The specific gel utilized was produced by mixing 22% by weight of aluminum sulphate together with 78% by weight of sulphuric acid and having a specific gravity of 1.840. Following the placing of the gel into a battery, 960 cc. of water were added, thereby producing 1200 cc. of electrolyte having a specific gravity of 1.250. After a stand of 30 minutes, the battery was discharged at a current of 300 amperes for a period of 4.25 minutes to a terminal voltage of one volt per cell. In comparison, an identical dry charged battery to which was added 1200 cc. of sulphuric acid electrolyte of 1.250 specific gravity gave 4.55 minutes when discharged at a current of 300 amperes after a stand of 30 minutes following the addition of the electrolyte.

From the test results given above, it can be seen that by means of the present invention, it is now practical to provide water activated batteries of the type which utilize sulphuric acid as the electrolyte. It also can be seen that by utilizing the teachings of the present invention, the disadvantages heretofore encountered in the shipping of storage batteries with electrolyte and in the activation of dry charged batteries have been overcome.

Having described the invention, that which is claimed is:

1. In a lead-acid type battery, a gel formed by the mixing of aluminum sulphate and sulphuric acid, said battery being adapted to be activated by the addition thereto of water to dissolve said gel to form electrolyte in situ.

2. A lead-acid type battery containing within its cell compartments a gel comprising aluminum sulphate mixed with sulphuric acid, said gel being adapted to dissolve in water to form therewith an electrolyte of the desired concentration for battery operation.

3. The article as specified in claim 2 wherein the gel is located near the top of the cell compartments.

4. In a lead-acid type storage battery, a gel adapted to dissolve in water to form an electrolyte for said battery comprising about three parts by weight of sulphuric acid having a specific gravity within the range of from about 1.300 to 1.840 and one part by weight of aluminum sulphate.

5. The gel as specified in claim 4 wherein said aluminum sulphate is of the form $Al_2(SO_4)_3.18H_2O$.

6. In a lead-acid type storage battery, a crystalline semi-solid gel adapted to provide a battery electrolyte having a specific gravity of 1.250 when 8 parts by weight of water are added to said battery comprising one part by weight of aluminum sulphate $(Al_2(SO_4)_3.18H_2O)$ and 3.5 parts by weight of sulphuric acid having a specific gravity of 1.840.

7. In a lead-acid type storage battery, a crystalline semi-solid gel adapted to provide a battery electrolyte having a specific gravity of 1.275 when 7.8 parts by weight of water are added to said battery comprising 1.1 parts by weight of aluminum sulphate $(Al_2(SO_4)_3.18H_2O)$ and 3.85 parts by weight of sulphuric acid having a specific gravity of 1.840.

8. In a lead-acid storage battery, a crystalline semi-solid gel adapted to provide a battery electrolyte having a specific gravity of 1.300 when 7.51 parts by weight of water are added to said battery comprising 1.22 parts by weight of aluminum sulphate $(Al_2(SO_4)_3.18H_2O)$ and 4.27 parts by weight of sulphuric acid having a specific gravity of 1.840.

9. In a lead-acid type storage battery, a crystalline semi-solid gel adapted to provide a battery electrolyte having a specific gravity of 1.250 when 6.46 parts by weight of water are added to said battery comprising 1.51 parts by weight of aluminum sulphate $(Al_2(SO_4)_3.18H_2O)$ and 4.53 parts by weight of sulphuric acid having a specific gravity of 1.700.

References Cited in the file of this patent

UNITED STATES PATENTS

| | | |
|---|---|---|
| 408,138 | Schoop | July 30, 1889 |
| 1,512,485 | Pouchain | Oct. 21, 1924 |
| 1,533,569 | Pouchain | Apr. 14, 1925 |
| 2,549,921 | Mosley | Apr. 24, 1951 |
| 2,803,690 | Stevens | Aug. 20, 1957 |

FOREIGN PATENTS

| | | |
|---|---|---|
| 6,664 | Great Britain | Nov. 9, 1911 |